United States Patent
Choi et al.

(10) Patent No.: US 12,384,085 B2
(45) Date of Patent: Aug. 12, 2025

(54) SYSTEM AND METHOD FOR ULTRASONIC INSPECTION OF RESIN FILL LEVEL IN A BATTERY MODULE

(71) Applicant: LG ENERGY SOLUTION, LTD., Seoul (KR)

(72) Inventors: Wonseok Choi, Daejeon (KR); Jaehyun Bae, Daejeon (KR); Kangil Lee, Daejeon (KR); Nahee Oh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 506 days.

(21) Appl. No.: 17/762,545

(22) PCT Filed: Apr. 27, 2021

(86) PCT No.: PCT/KR2021/005320
§ 371 (c)(1),
(2) Date: Mar. 22, 2022

(87) PCT Pub. No.: WO2021/235718
PCT Pub. Date: Nov. 25, 2021

(65) Prior Publication Data
US 2022/0339836 A1    Oct. 27, 2022

(30) Foreign Application Priority Data
May 20, 2020  (KR) .................. 10-2020-0060502

(51) Int. Cl.
*B29C 45/76*    (2006.01)
*B29C 45/14*    (2006.01)
(Continued)

(52) U.S. Cl.
CPC ...... *B29C 45/768* (2013.01); *B29C 45/14344* (2013.01); *G01F 23/2965* (2013.01);
(Continued)

(58) Field of Classification Search
CPC ....... G01F 23/2965; B29C 2945/76163; B29C 2945/7629; B29C 2945/76474;
(Continued)

(56) References Cited

U.S. PATENT DOCUMENTS

2016/0146760 A1    5/2016   Hwang et al.
2017/0348924 A1   12/2017   Auffray
(Continued)

FOREIGN PATENT DOCUMENTS

CN    107112607 A    8/2017
CN    107530990 A    1/2018
(Continued)

OTHER PUBLICATIONS

Extended European Search Report for European Application No. 21808839.1, dated Dec. 7, 2023.
(Continued)

*Primary Examiner* — David L Singer
(74) *Attorney, Agent, or Firm* — Birch, Stewart, Kolasch & Birch, LLP (57) ABSTRACT

An ultrasonic inspection system determines whether or not a thermally conductive resin forming a thermally conductive resin layer is filled through a waveform change of an ultrasonic wave measured by transmitting the ultrasonic wave toward a portion of an edge of a bottom surface of a module frame from the outside. An ultrasonic sensor at one of two opposite edges of an exterior surface of the bottom surface of the module frame determine a height of the resin within the battery module.

5 Claims, 5 Drawing Sheets

(51) Int. Cl.
| | |
|---|---|
| *B29L 31/00* | (2006.01) |
| *B29L 31/34* | (2006.01) |
| *G01F 23/2965* | (2022.01) |
| *G01N 29/032* | (2006.01) |
| *H01M 10/42* | (2006.01) |
| *H01M 10/48* | (2006.01) |
| *H01M 10/647* | (2014.01) |
| *H01M 10/653* | (2014.01) |
| *H01M 50/211* | (2021.01) |
| *H01M 50/227* | (2021.01) |
| *H01M 50/609* | (2021.01) |

(52) U.S. Cl.
CPC ...... *G01N 29/032* (2013.01); *H01M 10/4285* (2013.01); *H01M 10/48* (2013.01); *H01M 10/647* (2015.04); *H01M 10/653* (2015.04); *H01M 50/227* (2021.01); *H01M 50/609* (2021.01); *B29C 2945/76163* (2013.01); *B29C 2945/7629* (2013.01); *B29C 2945/76474* (2013.01); *B29C 2945/76558* (2013.01); *B29C 2945/76859* (2013.01); *B29C 2945/76933* (2013.01); *B29K 2995/0013* (2013.01); *B29L 2031/3468* (2013.01); *B29L 2031/7146* (2013.01); *G01N 2291/015* (2013.01); *G01N 2291/02836* (2013.01); *G01N 2291/044* (2013.01); *G01N 2291/106* (2013.01); *G01N 2291/2697* (2013.01); *H01M 50/211* (2021.01); *Y02E 60/10* (2013.01)

(58) Field of Classification Search
CPC .......... B29C 2945/76558; B29C 2945/76859; B29C 2945/76933; B29C 45/14; B29C 45/14336; B29C 45/14344; B29C 45/14508; B29C 45/14639; B29C 45/768; B29K 2995/0013; B29L 2031/3468; B29L 2031/7146; G01N 2291/015; G01N 2291/02836; G01N 2291/044; G01N 2291/106; G01N 2291/2697; G01N 29/032; G01N 29/04; H01M 10/42; H01M 10/4285; H01M 10/48; H01M 10/647; H01M 10/653; H01M 50/20; H01M 50/211; H01M 50/227; H01M 50/609; Y02E 60/10
See application file for complete search history.

(56) References Cited

U.S. PATENT DOCUMENTS

| | | | |
|---|---|---|---|
| 2017/0352931 A1 | 12/2017 | Yoshida et al. | |
| 2018/0076493 A1 | 3/2018 | Park et al. | |
| 2019/0051954 A1 | 2/2019 | Kim et al. | |
| 2019/0131678 A1* | 5/2019 | Kim | H01M 10/656 |
| 2019/0255568 A1 | 8/2019 | Kojima et al. | |
| 2020/0185797 A1 | 6/2020 | Park et al. | |
| 2020/0251789 A1 | 8/2020 | Park et al. | |
| 2020/0343607 A1 | 10/2020 | Kim et al. | |
| 2020/0350644 A1 | 11/2020 | Cho et al. | |
| 2021/0151820 A1 | 5/2021 | Kim et al. | |
| 2022/0090955 A1* | 3/2022 | Anquetil | G01F 23/2965 |

FOREIGN PATENT DOCUMENTS

| | | | | |
|---|---|---|---|---|
| CN | 109155449 A | | 1/2019 | |
| EP | 3 588 663 A1 | | 1/2020 | |
| JP | 1-195012 A | | 8/1989 | |
| JP | 2-162254 A | | 6/1990 | |
| JP | 3-138123 A | | 6/1991 | |
| JP | 9-5305 A | | 1/1997 | |
| JP | 2000-205931 A | | 7/2000 | |
| JP | 2000-221173 A | | 8/2000 | |
| JP | 2001-85062 A | | 3/2001 | |
| JP | 2001-194134 A | | 7/2001 | |
| JP | 2006-103190 A | | 4/2006 | |
| JP | 2010181290 A | * | 8/2010 | ............ G01F 23/28 |
| JP | 2012-69267 A | | 4/2012 | |
| JP | 5173227 B2 | | 4/2013 | |
| JP | 5287309 B2 | | 9/2013 | |
| JP | 2014-82020 A | | 5/2014 | |
| JP | 2018-510463 A | | 4/2018 | |
| JP | 6394480 B2 | | 9/2018 | |
| JP | 2018-206533 A | | 12/2018 | |
| JP | 2019-11649 A | | 1/2019 | |
| JP | 2019-146020 A | | 6/2019 | |
| JP | 2019-515461 A | | 6/2019 | |
| JP | 2020-82502 A | | 6/2020 | |
| JP | 2020082502 A | * | 6/2020 | .......... G01N 29/032 |
| KR | 10-2016-0062681 A | | 6/2016 | |
| KR | 10-2018-0007127 A | | 1/2018 | |
| KR | 10-2018-0084539 A | | 7/2018 | |
| KR | 10-1960950 B1 | | 3/2019 | |
| KR | 10-2020-0012547 A | | 2/2020 | |
| WO | WO-2019013508 A1 * | | 1/2019 | ............ G01N 21/29 |
| WO | WO 2020/022844 A1 | | 1/2020 | |

OTHER PUBLICATIONS

International Search Report (PCT/ISA/210) issued in PCT/KR2021/005320, dated Aug. 12, 2021.

* cited by examiner

600- ultrasonic sensor

FIG. 4

600- ultrasonic sesnor

SYSTEM AND METHOD FOR ULTRASONIC INSPECTION OF RESIN FILL LEVEL IN A BATTERY MODULE

TECHNICAL FIELD

Cross-Reference to Related Application(s)

This application claims priority to and the benefit of Korean Patent Application No. 10-2020-0060502 filed in the Korean Intellectual Property Office on May 20, 2020, the entire contents of which are incorporated herein by reference.

The present invention relates to an ultrasonic inspection system and method, and more particularly, to an ultrasonic non-destructive inspection system and method that may check whether a battery module is filled with a thermally conductive resin.

BACKGROUND ART

A secondary battery has attracted a great deal of attention as an energy source in various products such as a mobile device and an electric vehicle. The secondary battery is a strong energy source that may replace use of existing products that use fossil fuels, and is being highlighted as an environmentally friendly energy source because no by-products are generated according to energy use.

Recently, as needs for a large-capacity secondary battery structure along with use of the secondary battery as an energy storage source are increasing, there is an increasing demand for a battery pack having a multi-module structure in which a battery module in which a plurality of secondary batteries are connected in series/parallel is assembled in plural.

Meanwhile, when configuring a battery pack by connecting a plurality of battery cells in series/parallel, a method of configuring a battery module consisting of at least one battery cell and then configuring a battery pack by adding other components to at least one battery module is generally used.

The battery module includes a battery cell stacked body in which a plurality of battery cells are stacked, a module frame accommodating the battery cell stacked body, and a thermally conductive resin layer formed by injecting between the battery cell stacked body and the module frame.

The thermally conductive resin layer mainly serves to perform a cooling function that transmits heat generated inside the battery module to the outside, and thus, after liquid-injecting the thermally conductive resin into the battery module, inspecting whether the thermally conductive resin is properly applied to a bottom surface of the module frame is essentially required.

Conventionally, while the thermally conductive resin that has been liquid-injected into a checking hole formed on the bottom surface of the module frame is being filled, a vision sensor recognizes this to adjust a liquid-injection amount of the thermally conductive resin. However, the vision sensor has a problem in that detection power itself is poor and it is difficult to check whether parts other than the checking hole are filled. In addition, after the thermally conductive resin is cured, a post-process is required to remove the thermally conductive resin that has overflown in the checking hole, which may result in loss of the thermally conductive resin.

DISCLOSURE

Technical Problem

The present invention has been made in an effort to provide an ultrasonic inspection system and method that may accurately check an applied state of a thermally conductive resin layer formed inside a battery module while preventing loss of a thermally conductive resin.

The objects of the present invention are not limited to the objects mentioned above, and other objects not mentioned can be clearly understood by those skilled in the art from the description below.

Technical Solution

An embodiment of the present invention provides an ultrasonic inspection system, including: a battery module that includes a battery cell stacked body in which a plurality of battery cells are stacked; a module frame accommodating the battery cell stacked body; a thermally conductive resin layer formed by liquid-injecting injecting a thermally conductive resin between a lower end of the battery cell stacked body and a bottom surface of the module frame, and at least one ultrasonic sensor contacting an exterior surface of the module frame wherein the at least one ultrasonic sensor determines whether the thermally conductive resin forming the thermally conductive resin layer is filled through a waveform change of an ultrasonic wave measured by transmitting the ultrasonic wave toward a portion of an edge of the bottom surface of the module frame from outside of the module frame.

The at least one ultrasonic sensor that transmits and senses the ultrasonic wave may be disposed to contact the bottom surface of the module frame at the outside of the module frame.

The at least one ultrasonic sensor is a plurality of the ultrasonic sensors, and the plurality of ultrasonic sensors may be disposed at edges of the bottom surface of the module frame.

The thermally conductive resin layer may be formed by liquid-injecting a thermally conductive resin through at least one liquid-injection hole formed in the bottom surface of the module frame.

The at least one liquid-injection hole is a plurality of liquid-injection holes, and the plurality of the liquid-injection holes may be arranged in a central portion of the bottom surface of the module frame.

The at least one ultrasonic sensor is spaced apart from the plurality of liquid-injection holes.

Another embodiment of the present invention provides an ultrasonic inspection method, including: liquid-injecting a thermally conductive resin through at least one liquid-injection hole formed in a bottom surface of a module frame; stopping the liquid-injecting of the thermally conductive resin and disposing at least one ultrasonic sensor on one portion of an outer edge of the bottom surface of the module frame; transmitting an ultrasonic wave into the bottom surface of the module frame through the ultrasonic sensor; and determining whether the thermally conductive resin is filled according to a waveform of the ultrasonic wave.

When it is determined that the thermally conductive resin is filled through the waveform of the ultrasonic wave, completing the liquid-injecting may be further included.

When it is determined that the thermally conductive resin is not filled through the waveform of the ultrasonic wave, additionally liquid-injecting the thermally conductive resin through the at least one liquid-injection hole may be further included.

After the determining that the thermally conductive resin is filled according to the waveform of the ultrasonic wave, disposing the at least one ultrasonic sensor on a second portion of the outer edge of the bottom surface of the module frame and transmitting an ultrasonic wave to determine whether the thermally conductive resin is filled according to a waveform of the ultrasonic wave may be further included.

Advantageous Effects

The ultrasonic inspection system and method according to the embodiment of the present invention provide an effect of accurately determining whether a thermally conductive resin is filled by using an ultrasonic sensor.

The effects of the present invention are not limited to the effects mentioned above, and other effects not mentioned can be clearly understood by those skilled in the art from the description of the claims.

MODE FOR INVENTION

Embodiments described below are exemplarily illustrated for understanding of the invention, and it should be understood that the present invention may be modified in various ways to be different from the embodiments described herein. However, in the description of the present invention, the detailed description and illustration of related well-known functions or constituent elements will be omitted when it is determined as unnecessarily making the scope of the present invention unclear.

The terms "first", "second", etc. used in the present specification may be used to describe various constituent elements, but the constituent elements should not be limited to the terms. The terms should be used only for differentiating one constituent element from another constituent element.

The terms used in the specification are used to describe only specific embodiments and are not intended to limit the scope of the present invention. Singular forms are intended to include plural forms unless the context clearly indicates otherwise. In the present specification, it should be understood that the term "include", "comprise", "have", or "configure" indicates that a feature, a number, a step, an operation, a component, a part, or a combination thereof described in the specification is present, but does not exclude a possibility of presence or addition of one or more other features, numbers, steps, operations, components, parts, or combinations, in advance.

Hereinafter, a battery module according to an embodiment of the present invention will be described with reference to FIG. 1 and FIG. 2.

Figure 1:
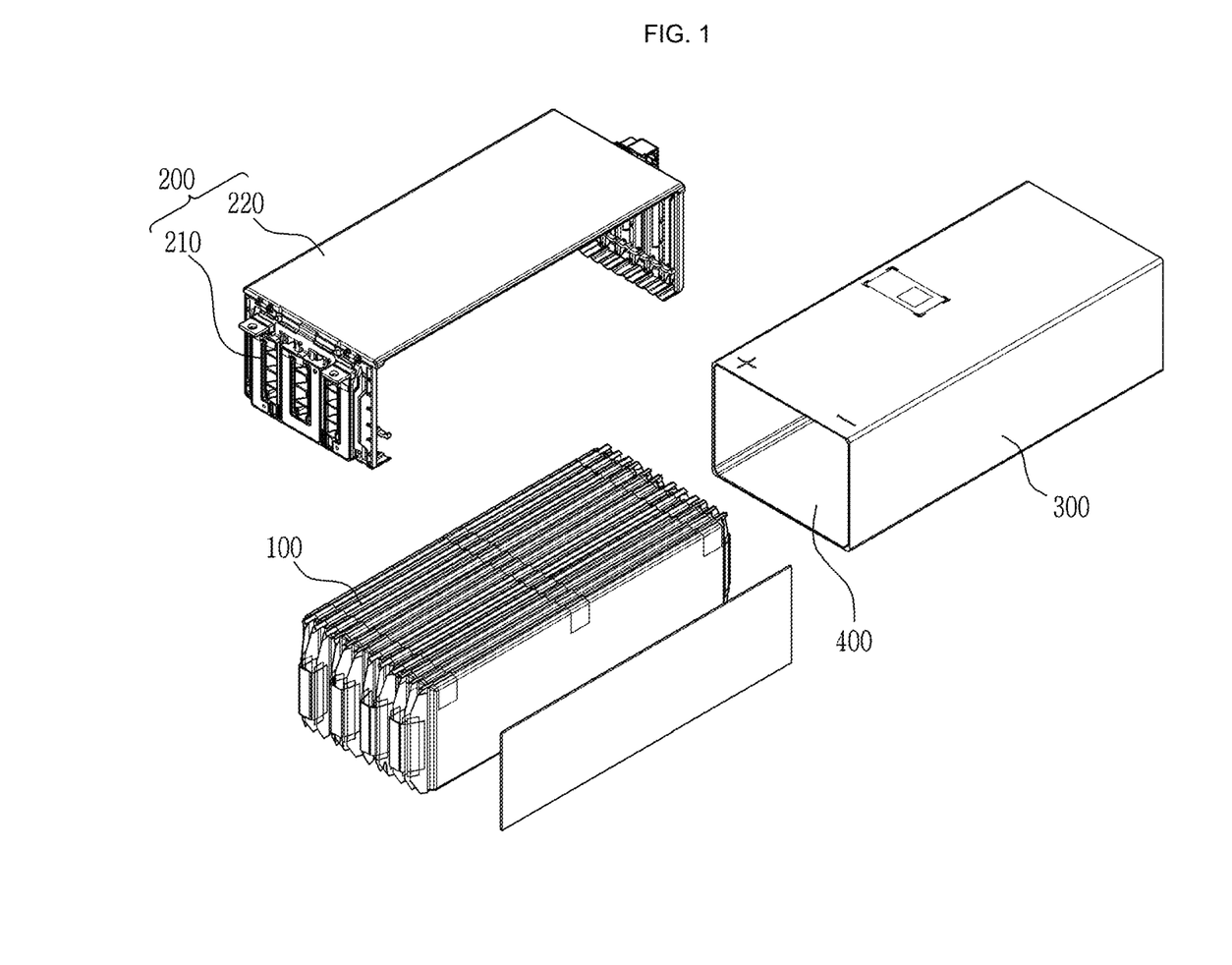
FIG. 1 illustrates an exploded perspective view of a battery module according to an embodiment of the present invention.

FIG. 1 illustrates an exploded perspective view of a battery module according to an embodiment of the present invention. FIG. 2 illustrates a perspective view of a bottom surface of a battery module according to an embodiment of the present invention.

Figure 2:
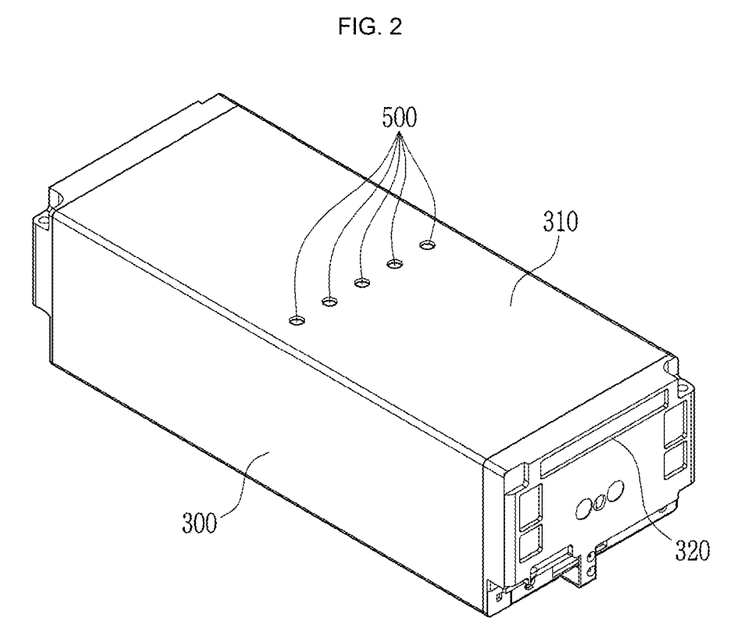
FIG. 2 illustrates a perspective view of a bottom surface of a battery module according to an embodiment of the present invention.

Referring to FIG. 1 and FIG. 2, the battery module according to the present embodiment includes a battery cell stacked body 100 in which a plurality of battery cells are stacked, a module frame 300 for accommodating the battery cell stacked body 100, and a thermally conductive resin layer 400 formed by liquid-injecting a thermally conductive resin between a lower end of the battery cell stacked body 100 and a bottom surface of the module frame 300.

The battery cell is a secondary battery, and may be configured as a pouch-type of secondary battery. A plurality of battery cells may be configured, and the plurality of battery cells may be stacked on each other to be electrically connected to each other to form the battery cell stacked body 100. Each of the plurality of battery cells may include an electrode assembly, a battery case, and an electrode lead protruding from the electrode assembly.

A bus bar frame assembly 200 is formed on front and rear surfaces and an upper surface of the battery cell stack 100. The bus bar frame assembly 200 is formed with a bus bar frame 210 that covers the front and rear surfaces of the battery cell stacked body 100 and electrically connects electrode leads of a plurality of battery cells, and an upper plate 220 that covers the upper surface of the battery cell stacked body 100 and connects the bus bar frames 210 at both ends thereof. A flexible circuit board is provided at a lower surface of the upper plate 220, so that the bus bar frames at both ends may be electrically connected to each other.

The module frame 300 is formed with upper, lower, left, and right surfaces to accommodate the battery cell stacked body 100 and the bus bar frame assembly 200. Compression pads are formed at portions in which the outermost battery cells of the battery cell stacked body 100 meet the left and right surfaces of the frame, respectively, to absorb a tolerance between the module frame 300 and the battery cells when swelling of the battery cells occurs.

When the battery cell stacked body 100 and the bus bar frame assembly 200 are accommodated in the module frame 300, an end plate 320 is coupled to the front and rear surfaces of the module frame 300 to cover the front and rear surfaces of the battery cell stacked body 100. Through this, electronic components inside the module frame 300 may be protected, and the battery module may be mounted on the battery pack through a mounting structure formed on the end plate 320.

The thermally conductive resin layer 400 may be formed by injecting a thermally conductive resin between a lower end of the battery cell stacked body 100 and a bottom surface 310 of the module frame 300. The thermally conductive resin may be formed of a thermal resin. A sufficient amount of the thermally conductive resin layer 400 may be liquid-injected so as to contact lower ends of a plurality of battery cells of the battery cell stacked body 100. By transmitting heat generated in the battery cell stacked body 100 through the thermally conductive resin layer 400 and dissipating it to the outside, a cooling function of the battery module may be performed.

The thermally conductive resin layer 400 may be formed by liquid-injecting a thermally conductive resin through a liquid-injection hole 500 formed in the bottom surface of the module frame 300 as shown in FIG. 2. In this case, a plurality of liquid-injection holes 500 may be arranged on a central portion of the bottom surface 310 of the module frame 300. The thermally conductive resin may be formed of a thermal resin.

Hereinafter, an ultrasonic inspection system according to an embodiment of the present invention will be described with reference to FIG. 3 to FIG. 5.

Figure 3:
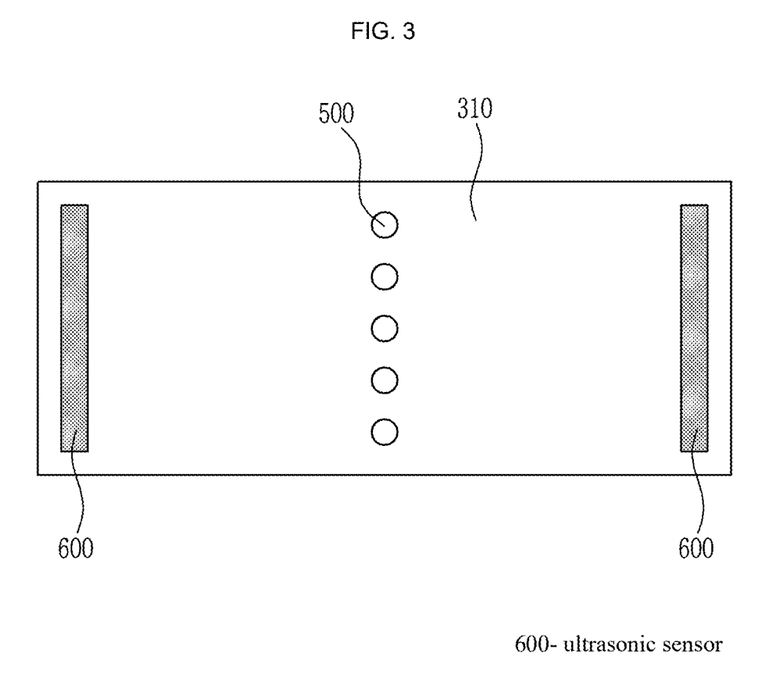
FIG. 3 illustrates a position of an ultrasonic sensor according to an embodiment of the present invention.

FIG. 3 illustrates a position of an ultrasonic sensor according to an embodiment of the present invention. FIG. 4 illustrates a side cross-sectional view of an ultrasonic inspection position during liquid-injection of a thermally conductive resin according to an embodiment of the present invention. FIG. 5 is a comparative drawing of an ultrasonic inspection method for determining whether a thermally conductive resin is filled or not according to an embodiment of the present invention.

Figure 4:
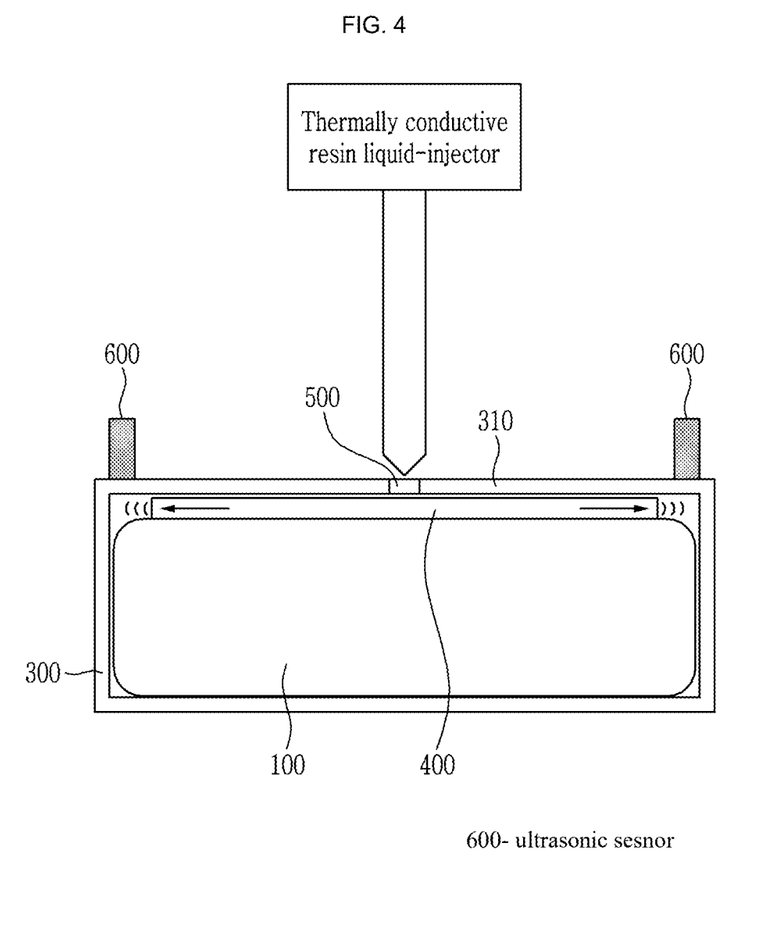
FIG. 4 illustrates a side cross-sectional view of an ultrasonic inspection position during liquid-injection of a thermally conductive resin according to an embodiment of the present invention.
Figure 5:
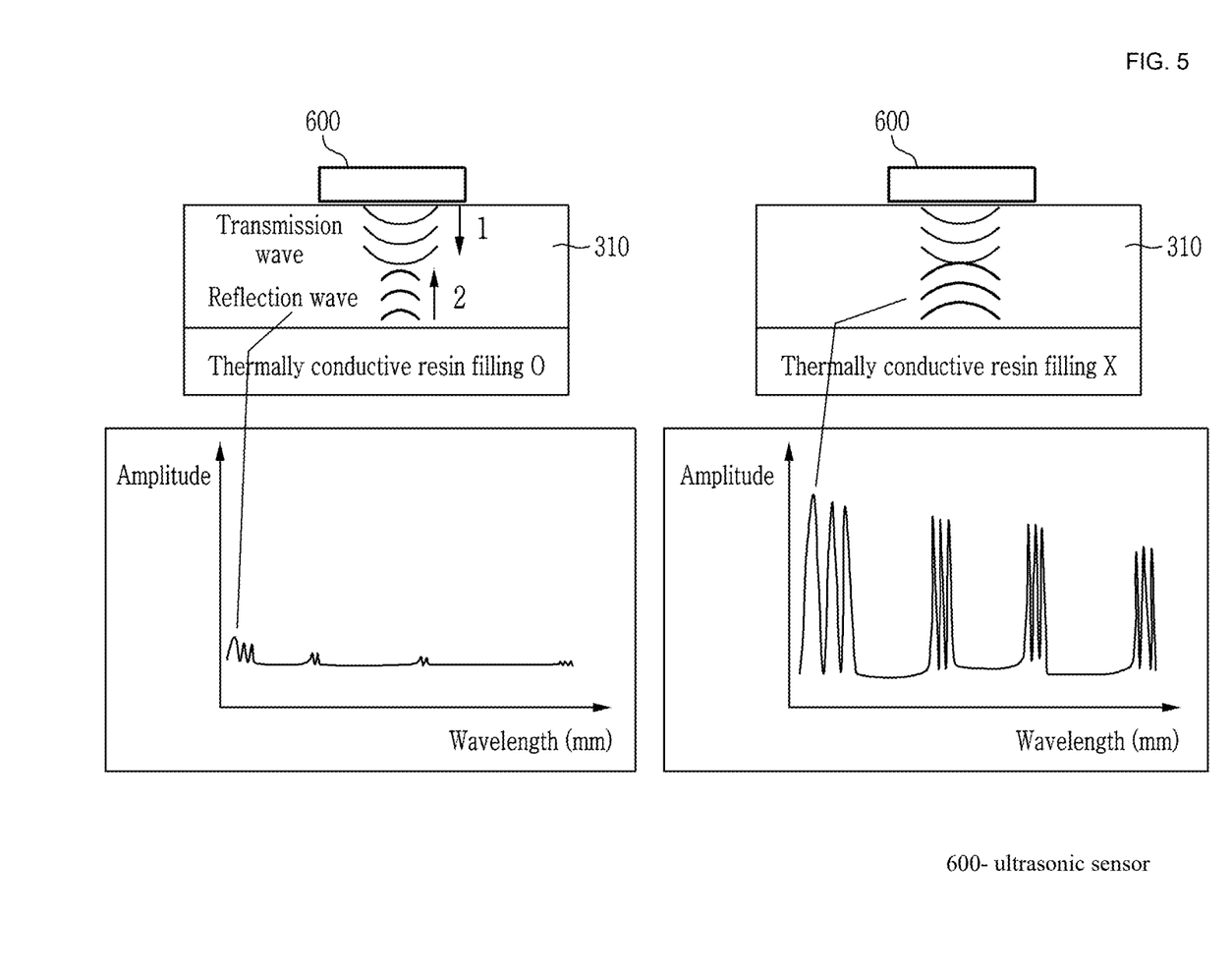
FIG. 5 is a comparative drawing of an ultrasonic inspection method for determining whether a thermally conductive resin is filled or not according to an embodiment of the present invention.

Referring to FIG. 3 to FIG. 5, the ultrasonic inspection system according to the present embodiment determines whether the thermally conductive resin forming the thermally conductive resin layer 400 is filled or not through a waveform change of an ultrasonic wave measured by transmitting an ultrasonic wave toward a portion of an edge of the bottom surface 310 of the module frame from the outside.

Conventionally, when the thermally conductive resin liquid-injected into a checking hole is filled, a vision sensor recognizes this to adjust an amount of liquid-injection. However, the vision sensor has a problem in that detection power of the thermally conductive resin is low, and it is difficult to determine whether the thermally conductive resin is filled in a part other than the checking hole. Particularly, since the liquid-injection hole is formed in a center of the bottom surface of the module frame, there is a problem that it is not possible to check whether the thermally conductive resin is filled up to an edge of the bottom surface of the module frame far from the liquid-injection hole.

In addition, when the thermally conductive resin is sufficiently liquid-injected, since the thermally conductive resin is cured after overflowing through the checking hole, a post-process is required to remove a portion that overflows through the checking hole and is cured, and an amount of the thermally conductive resin that overflows and then is cured may be lost.

Meanwhile, according to the present embodiment, an ultrasonic wave is transmitted toward a part of an edge of the bottom surface 310 of the module frame, and a reflected wave of the transmitted ultrasonic wave is measured, so that since it is possible to check whether the thermally conductive resin forming the thermally conductive resin layer is filled up to an edge of the bottom surface of the module frame through a wave change of the measured ultrasonic wave, it is possible to accurately determine whether or not the thermally conductive resin is filled.

In addition, since it is possible to check whether the thermally conductive resin is filled inside the battery module with only the ultrasonic sensor, no method of measuring the presence or absence of filling through the checking hole is required, so that it is possible to reduce a processing cost of the conventional check hole, the process of removing the thermally conductive resin that overflows and is cured through the checking hole may be omitted, and a material cost of the thermally conductive resin may be reduced by a removal amount of the thermally conductive resin that overflows and is cured.

According to the present embodiment, as shown in FIG. 4, an ultrasonic sensor 600 for transmitting and sensing an ultrasonic wave may be disposed to contact the bottom surface 310 of the module frame at the outside of the module frame 300. A plurality of ultrasonic sensors 600 may be formed, and the plurality of ultrasonic sensors may be disposed at an edge of the bottom surface of the module frame.

The thermally conductive resin layer 400 may be formed by liquid-injecting the thermally conductive resin through the liquid-injection hole 500 formed in the bottom surface 310 of the module frame, and a plurality of the liquid-injection holes 500 are arranged in a central portion of the bottom surface 310 of the module frame, so that a position at which the ultrasonic wave is transmitted may be a position spaced apart from the plurality of the liquid-injection holes 500. Therefore, it is possible to check whether the thermally conductive resin liquid-injected through the liquid-injection hole 500 is applied up to a position spaced from the liquid-injection hole 500 through a space between the battery cell stacked body 100 and the bottom surface 310 of the module frame by using the ultrasonic wave.

Referring to FIG. 5, in the portion where the thermally conductive resin is not filled inside the battery module, a waveform unique to aluminum, which is a material of the bottom surface 310 of the module frame, is observed, but in the portion where the thermally conductive resin is filled, a waveform disappears, that is, a waveform difference occurs. Through this, by contacting the ultrasonic sensor 600 to a specific position of the bottom surface 310 of the module frame, it is possible to determine whether the thermally conductive resin is filled therein.

Hereinafter, an ultrasonic inspection method according to an embodiment of the present invention will be described with reference to FIG. 6.

Figure 6:
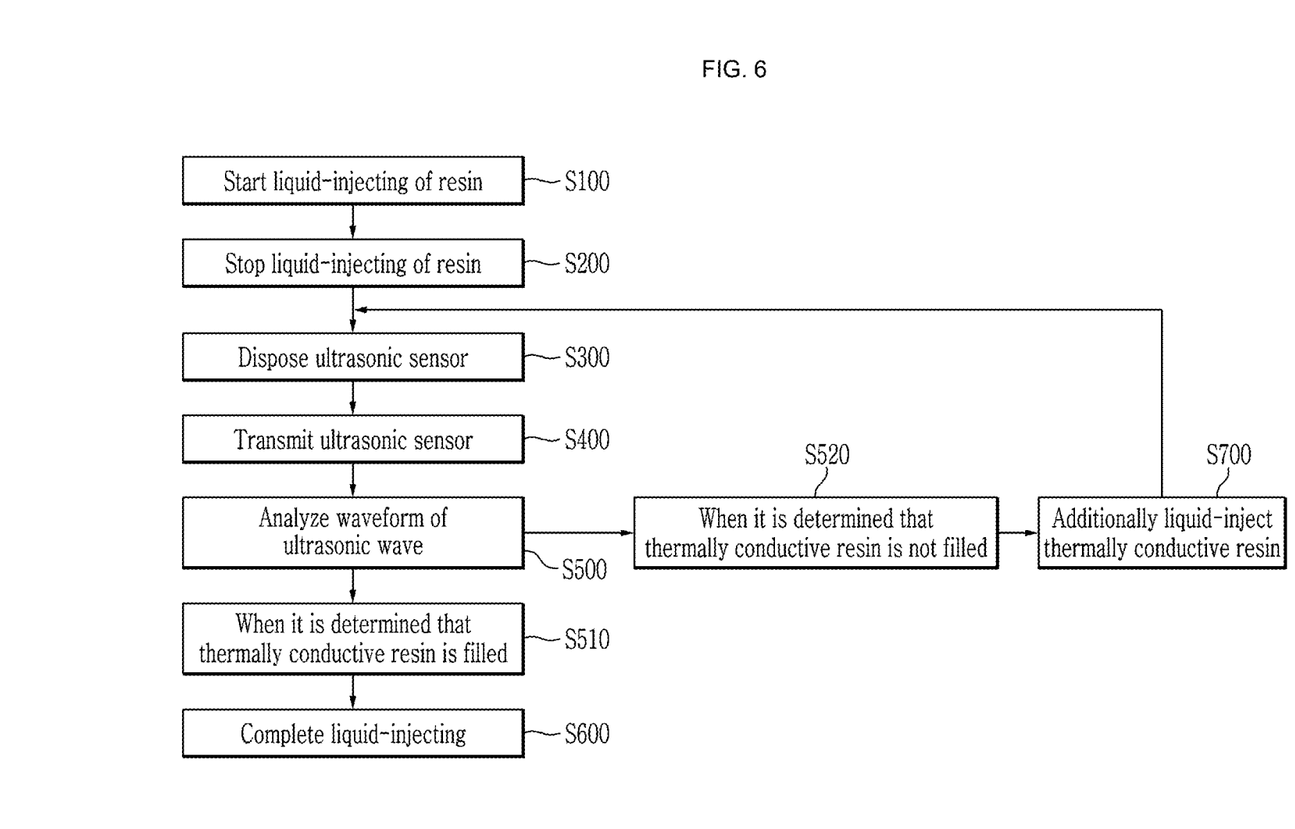
FIG. 6 illustrates a flowchart of an ultrasonic inspection method according to an embodiment of the present invention.

FIG. 6 illustrates a flowchart of an ultrasonic inspection method according to an embodiment of the present invention.

Referring to FIG. 4 and FIG. 6, the ultrasonic inspection method according to the present embodiment includes liquid-injecting a thermally conductive resin through the liquid-injection hole 500 formed in the bottom surface 310 of the module frame (S100), stopping the liquid-injection of the thermally conductive resin (S200) and disposing an ultrasonic sensor on one portion (see FIG. 3) of an outer edge of the bottom surface 310 of the module frame (S300), transmitting an ultrasonic wave into the bottom surface 310 of the module frame through the ultrasonic sensor 600 (S400), and determining whether the thermally conductive resin is filled according to a waveform of the ultrasonic wave (S500).

According to the present embodiment, when it is determined that the thermally conductive resin is filled through the waveform of the ultrasonic wave, completing the liquid-injecting (S600) may be further included.

In addition, according to the present embodiment, when it is determined that the thermally conductive resin is not filled through the waveform of the ultrasonic wave (S520), additionally liquid-injecting the thermally conductive resin through the liquid-injection hole 500 (S700) may be further included. After the thermally conductive resin is additionally liquid-injected, the ultrasonic sensor is disposed again at a previously disposed position, and the ultrasonic wave may be transmitted to re-check whether the thermally conductive resin is filled at the corresponding position.

In addition, according to the present embodiment, when it is determined that the thermally conductive resin is filled through the waveform of the ultrasonic wave, completing the liquid-injecting (S600) may be further included.

Further, according to the present embodiment, after the determining of whether the thermally conductive resin is filled according to the waveform of the ultrasonic wave, disposing the ultrasonic sensor 600 on the other portion of the outer edge of the bottom surface 310 of the module frame and transmitting an ultrasonic wave to determine whether the thermally conductive resin is filled according to a waveform of the ultrasonic wave may be further included. Through this, it is possible to check whether the thermally conductive resin is filled or not at several points on the bottom surface of the module frame 310, so that it is possible to more accurately determine whether the thermally conductive resin is filled or not.

In the foregoing description, the embodiments of the present invention have been illustrated and described, but the present invention is not limited to the specific embodiments, and it will be apparent to those skilled in the art that various modifications and variations may be made without departing from the spirit or scope of the invention, and thus, it is intended that the present invention cover the modifications and variations of this invention provided they come within the scope of the appended claims and their equivalents.

DESCRIPTION OF SYMBOLS

100: battery cell stacked body
200: bus bar frame assembly
300: module frame
310: bottom surface of module frame
320: end plate
400: thermally conductive resin layer
500: liquid-injection hole
600: ultrasonic sensor

The invention claimed is:

1. An ultrasonic inspection system, comprising:
a battery module comprising:
a battery cell stacked body in which a plurality of battery cells are stacked;
a module frame accommodating the battery cell stacked body;
a thermally conductive resin layer formed by liquid-injecting a thermally conductive resin between a lower end of the battery cell stacked body and a bottom surface of the module frame; and
at least one ultrasonic sensor at one of two opposite edges of an exterior surface of the bottom surface of the module frame,
wherein the at least one ultrasonic sensor determines the thermally conductive resin forming the thermally conductive resin layer is filled through a waveform change of an ultrasonic wave measured by transmitting the ultrasonic wave toward a portion of an edge of the bottom surface of the module frame from outside of the module frame,
wherein the at least one ultrasonic sensor is a plurality of the ultrasonic sensors,
wherein the plurality of ultrasonic sensors is disposed at both of the two opposite edges of the bottom surface of the module frame,
wherein the thermally conductive resin layer is formed by liquid-injecting the thermally conductive resin through at least one liquid-injection hole formed in the bottom surface of the module frame,
wherein the at least one liquid-injection hole is a plurality of liquid-injection holes,
wherein the plurality of liquid-injection holes is arranged in a central portion of the bottom surface of the module frame, and
wherein the plurality of ultrasonic sensors is spaced apart from the plurality of liquid-injection holes.

2. An ultrasonic inspection method, comprising:
liquid-injecting a thermally conductive resin through at least one liquid-injection hole formed in a bottom surface of a module frame;
stopping the liquid-injecting of the thermally conductive resin and disposing at least one ultrasonic sensor on one portion of one of two opposite edges of the bottom surface of the module frame;
transmitting an ultrasonic wave into the bottom surface of the module frame through the ultrasonic sensor; and
determining whether the thermally conductive resin is filled according to a waveform of the ultrasonic wave,
wherein the at least one ultrasonic sensor is a plurality of the ultrasonic sensors,
wherein the plurality of ultrasonic sensors is disposed at both of the two opposite edges of the bottom surface of the module frame,
wherein a thermally conductive resin layer is formed by liquid-injecting the thermally conductive resin through at least one liquid-injection hole formed in the bottom surface of the module frame,
wherein the at least one liquid-injection hole is a plurality of liquid-injection holes,
wherein the plurality of liquid-injection holes is arranged in a central portion of the bottom surface of the module frame, and
wherein the plurality of ultrasonic sensors is spaced apart from the plurality of liquid-injection holes.

3. The ultrasonic inspection method of claim 2, further comprising:
when it is determined that the thermally conductive resin is filled through the waveform of the ultrasonic wave, completing the liquid-injecting.

4. The ultrasonic inspection method of claim 2, further comprising
when it is determined that the thermally conductive resin is not filled through the waveform of the ultrasonic wave, additionally liquid-injecting the thermally conductive resin through the at least one liquid-injection hole.

5. The ultrasonic inspection method of claim 2, further comprising
after the determining that the thermally conductive resin is filled according to the waveform of the ultrasonic wave, disposing the at least one ultrasonic sensor on a second portion of the outer edge of the bottom surface of the module frame and transmitting an ultrasonic wave to determine whether the thermally conductive resin is filled according to a waveform of the ultrasonic wave.

* * * * *